(12) United States Patent
McCormick

(10) Patent No.: US 9,077,221 B2
(45) Date of Patent: Jul. 7, 2015

(54) GAS TURBINE ENGINE

(71) Applicant: Rolls-Royce North American Technologies, Inc., Indianapolis, IN (US)

(72) Inventor: Mark S. McCormick, Martinsville, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 0 days.

(21) Appl. No.: 14/105,370

(22) Filed: Dec. 13, 2013

(65) Prior Publication Data

US 2014/0246864 A1    Sep. 4, 2014

Related U.S. Application Data

(60) Provisional application No. 61/771,891, filed on Mar. 3, 2013.

(51) Int. Cl.
| | |
|---|---|
| *F02G 1/00* | (2006.01) |
| *H02K 7/18* | (2006.01) |
| *F01D 15/10* | (2006.01) |
| *F02K 3/02* | (2006.01) |

(52) U.S. Cl.
CPC .............. *H02K 7/1823* (2013.01); *F01D 15/10* (2013.01); *F02K 3/02* (2013.01); *F05D 2220/76* (2013.01)

(58) Field of Classification Search
USPC ....................................................... 290/1 A
See application file for complete search history.

(56) References Cited

U.S. PATENT DOCUMENTS

| | | | |
|---|---|---|---|
| 3,859,785 A | 1/1975 | Leto et al. | |
| 4,253,031 A | 2/1981 | Frister | |
| 4,555,637 A * | 11/1985 | Irvine .............................. | 290/52 |
| 5,376,827 A * | 12/1994 | Hines ............................... | 290/52 |
| 6,729,140 B2 | 5/2004 | Care et al. | |
| 6,832,486 B2 | 12/2004 | Care et al. | |
| 7,224,082 B2 | 5/2007 | Bouiller et al. | |
| 7,251,942 B2 | 8/2007 | Dittmar et al. | |
| 7,285,871 B2 * | 10/2007 | Derouineau .................... | 290/52 |
| 7,495,354 B2 | 2/2009 | Herrmann | |
| 7,603,864 B2 * | 10/2009 | Gemin et al. .................. | 60/802 |
| 7,721,555 B2 | 5/2010 | Sharp et al. | |
| 7,802,757 B2 * | 9/2010 | Dooley et al. .................. | 244/60 |
| 7,973,421 B2 * | 7/2011 | Sharp .............................. | 290/52 |
| 8,508,062 B2 * | 8/2013 | Gozdawa ........................ | 290/52 |
| 8,519,555 B2 * | 8/2013 | Dooley et al. ................. | 290/1 A |

(Continued)

FOREIGN PATENT DOCUMENTS

EP    2280150 A1    2/2011

OTHER PUBLICATIONS

Fishman /Stewart Proposed Amendment , Apr. 24, 2015.*

(Continued)

*Primary Examiner* — Joseph Waks
(74) *Attorney, Agent, or Firm* — Fishman Stewart Yamaguchi PLLC

(57) ABSTRACT

One embodiment of the present is may include a gas turbine engine having an electrical machine for generating electrical power. Other embodiments may include other gas turbine engines having electrical machines for generating electrical power. Still other embodiments may include apparatuses, systems, devices, hardware, methods, and combinations for gas turbine engines having electrical machines for generating electrical power.

19 Claims, 2 Drawing Sheets

(56) References Cited

U.S. PATENT DOCUMENTS

| | | | |
|---|---|---|---|
| 8,522,522 B2* | 9/2013 | Poisson | 60/39.093 |
| 8,745,990 B2* | 6/2014 | Burkholder et al. | 60/788 |
| 2006/0137355 A1* | 6/2006 | Welch et al. | 60/772 |
| 2008/0120980 A1 | 5/2008 | Gemin et al. | |
| 2008/0265580 A1 | 10/2008 | Sharp | |
| 2009/0115295 A1 | 5/2009 | Colin | |
| 2010/0143100 A1* | 6/2010 | Sharp | 415/170.1 |
| 2011/0291413 A1 | 12/2011 | Wamble, III et al. | |

OTHER PUBLICATIONS

International Search Report for PCT/US2013/072068 mailed Apr. 22, 2014.

* cited by examiner

GAS TURBINE ENGINE

CROSS-REFERENCE TO RELATED APPLICATIONS

This application claims priority to U.S. Provisional Patent Application No. 61/771,891 filed Mar. 3, 2013, the contents of which are hereby incorporated in their entirety.

FIELD OF THE DISCLOSURE

The present disclosure relates to gas turbine engines, and more particularly, to gas turbine engines equipped with electrical machines for generating electrical power.

BACKGROUND

Gas turbine engines with generator or alternator systems remain an area of interest. Some existing systems have various shortcomings, drawbacks, and disadvantages relative to certain applications. Accordingly, there remains a need for further contributions in this area of technology.

SUMMARY

One embodiment of the present disclosure is a unique gas turbine engine having an electrical machine for generating electrical power. Other embodiments include other unique gas turbine engines having electrical machines for generating electrical power. Still other embodiments include apparatuses, systems, devices, hardware, methods, and combinations for gas turbine engines having electrical machines for generating electrical power. Further embodiments, forms, features, aspects, benefits, and advantages of the present application will become apparent from the description and figures provided herewith.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
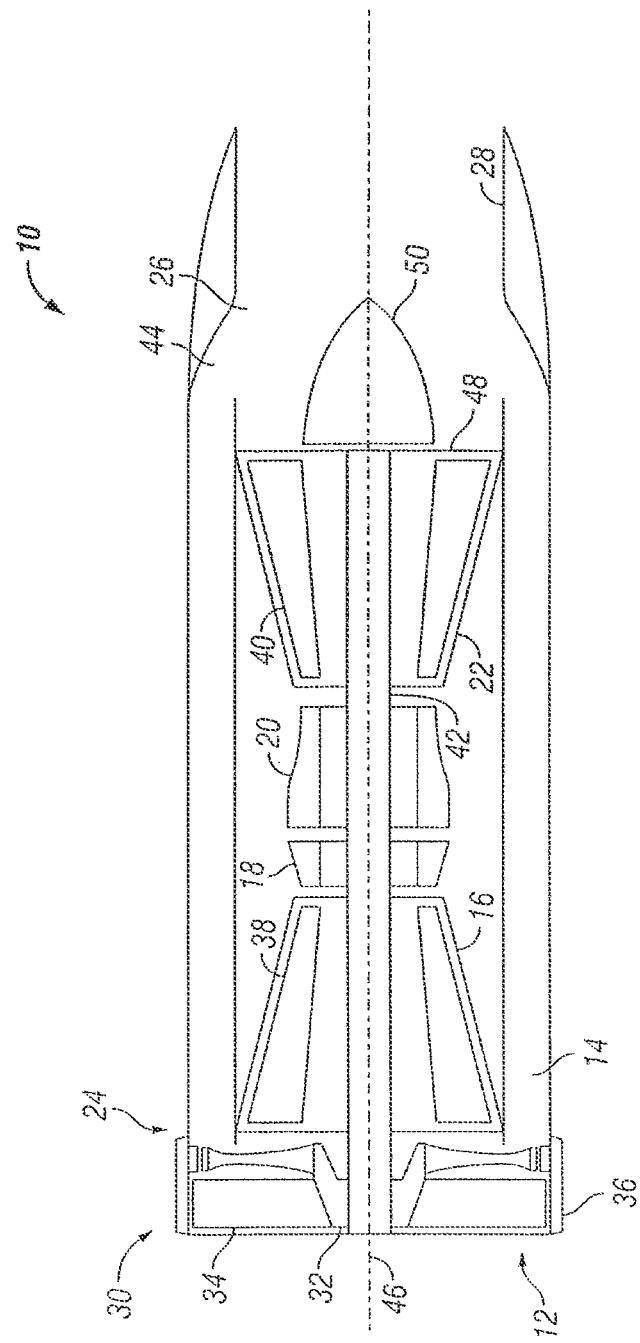
FIG. 1 schematically illustrates some aspects of a non-limiting example of a gas turbine engine in accordance with an embodiment of the present disclosure.

For purposes of promoting an understanding of the principles of the disclosure, reference will now be made to the embodiments illustrated in the drawings, and specific language will be used to describe the same. It will nonetheless be understood that no limitation of the scope of the disclosure is intended by the illustration and description of certain embodiments of the disclosure. In addition, any alterations and/or modifications of the illustrated and/or described embodiment(s) are contemplated as being within the scope of the present disclosure. Further, any other applications of the principles of the disclosure, as illustrated and/or described herein, as would normally occur to one skilled in the art to which the disclosure pertains, are contemplated as being within the scope of the present disclosure.

Referring to the drawings, and in particular FIG. 1, a non-limiting example of some aspects of a gas turbine engine 10 in accordance with an embodiment of the present disclosure is schematically depicted. In one form, gas turbine engine 10 is an aircraft propulsion power plant. In other embodiments, gas turbine engine 10 may be a land-based or marine engine. In one form, gas turbine engine 10 is a multi-spool turbofan engine. In other embodiments, gas turbine engine 10 may take other forms, and may be, for example, a turboshaft engine, a turbojet engine, a turboprop engine, or a combined cycle engine having a single spool or multiple spools.

As a turbofan engine, gas turbine engine 10 includes a fan system 12, a bypass duct 14, a compressor 16, a diffuser 18, a combustor 20, a turbine 22, an electrical machine 24, a discharge duct 26 and a nozzle system 28. Bypass duct 14 and compressor 16 are in fluid communication with fan system 12. Diffuser 18 is in fluid communication with compressor 16. Combustor 20 is fluidly disposed between compressor 16 and turbine 22. In one form, combustor 20 includes a combustion liner (not shown) that contains a continuous combustion process. In other embodiments, combustor 20 may take other forms, and may be, for example and without limitation, a wave rotor combustion system, a rotary valve combustion system or a slinger combustion system, and may employ deflagration and/or detonation combustion processes.

Fan system 12 includes a fan rotor system 30. In various embodiments, fan rotor system 30 includes one or more rotors (not shown) that are powered by turbine 22. In the depicted embodiments, fan rotor system 30 is a cold section rotating stage in the form of a single rotating fan blade stage having a wheel 32 and a plurality of fan blades 34 that are circumferentially surrounded by a fan shroud 36. In one form shroud 36 is configured to retain one or more blades 34 within engine 10 during a blade-off event. In other embodiments, shroud 36 may not be so configured.

Bypass duct 14 is operative to transmit a bypass flow generated by fan system 12 to nozzle 28. Compressor 16 includes a compressor rotor system 38, which are also referred to as cold section stages. In various embodiments, compressor rotor system 38 includes one or more rotors (not shown) that are powered by turbine 22. Each compressor rotor includes a plurality of rows of compressor blades (not shown) that are alternatingly interspersed with rows of compressor vanes (not shown). The compressor blades are circumferentially surrounded by shrouds, e.g., in the form of blade tracks mounted on or formed as part of one or more compressor cases (not shown). Turbine 22 includes a turbine rotor system 40. In various embodiments, turbine rotor system 40 includes one or more rotors (not shown) operative to drive fan rotor system 30 and compressor rotor system 38. Each turbine rotor includes a plurality of turbine blades (not shown) that are alternatingly interspersed with rows of turbine vanes (not shown). The turbine blades are circumferentially surrounded by shrouds, e.g., in the form of blade tracks mounted on or formed as part of one or more compressor cases (not shown).

Electrical machine 24 is configured to generate electrical power. In one form, electrical machine 24 is disposed in (or adjacent to) fan system 12. In other embodiments, electrical machine 24 may be disposed within (or adjacent to) compressor 16 or turbine 22. In various embodiments, electrical machine 24 may be configured as a generator, an alternator or any other type of electrical machine that is configured to generate electrical power.

Turbine rotor system 40 is drivingly coupled to compressor rotor system 38 and fan rotor system 30 via a shafting system 42. In various embodiments, shafting system 42 includes a plurality of shafts that may rotate at the same or different speeds and directions. In some embodiments, only a single shaft may be employed. Turbine 22 is operative to discharge an engine 10 core flow to nozzle 28. In one form, fan rotor system 30, compressor rotor system 38, turbine rotor system 40 and shafting system 42 rotate about an engine centerline 46. In other embodiments, all or parts of fan rotor system 30, compressor rotor system 38, turbine rotor system 40 and shafting system 42 may rotate about one or more other axes of rotation in addition to or in place of engine centerline 46.

Discharge duct 26 extends between a discharge portion 48 of turbine 22 and engine nozzle 28. Discharge duct 26 is operative to direct bypass flow and core flow from a bypass duct discharge portion 44 and turbine discharge portion 48, respectively, into nozzle system 28. In some embodiments, discharge duct 26 may be considered a part of nozzle 28. Nozzle 28 is in fluid communication with fan system 12 and turbine 22. Nozzle 28 is operative to receive the bypass flow from fan system 12 via bypass duct 14, and to receive the core flow from turbine 22, and to discharge both as an engine exhaust flow, e.g., a thrust-producing flow. In other embodiments, other nozzle arrangements may be employed, including separate nozzles for each of the core flow and the bypass flow.

During the operation of gas turbine engine 10, air is drawn into the inlet of fan 12 and pressurized by fan 12. Some of the air pressurized by fan 12 is directed into compressor 16 as core flow, and some of the pressurized air is directed into bypass duct 14 as bypass flow, and is discharged into nozzle 28 via discharge duct 26. Compressor 16 further pressurizes the portion of the air received therein from fan 12, which is then discharged into diffuser 18. Diffuser 18 reduces the velocity of the pressurized air, and directs the diffused core airflow into combustor 20. Fuel is mixed with the pressurized air in combustor 20, which is then combusted. The hot gases exiting combustor 20 are directed into turbine 22, which extracts energy in the form of mechanical shaft power sufficient to drive fan system 12 and compressor 16 via shafting system 42. The core flow exiting turbine 22 is directed along an engine tail cone 50 and into discharge duct 26, along with the bypass flow from bypass duct 14. Discharge duct 26 is configured to receive the bypass flow and the core flow, and to discharge both as an engine exhaust flow, e.g., for providing thrust, such as for aircraft propulsion.

Figure 2:
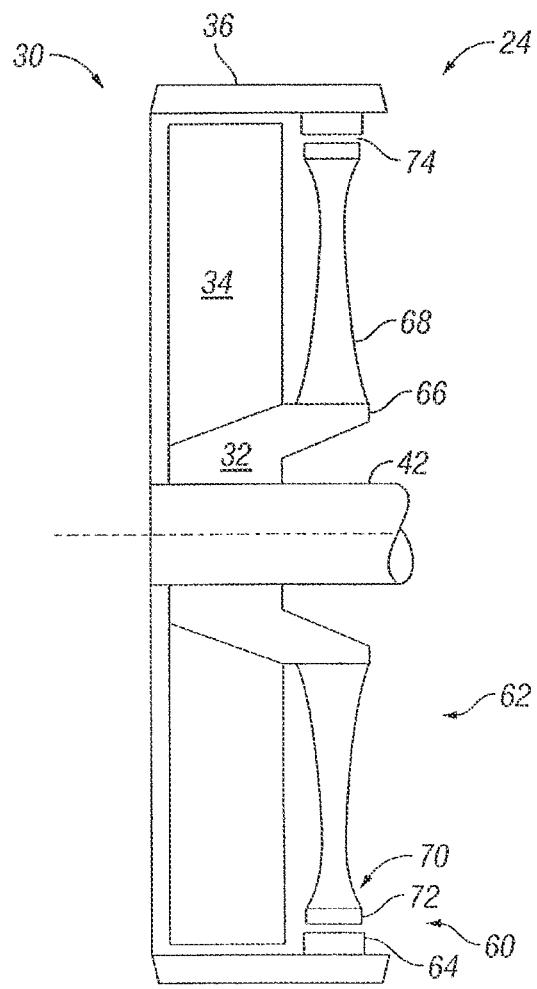
FIG. 2 schematically illustrates some aspects of a non-limiting example of an electrical machine for generating electrical power in accordance with an embodiment of the present disclosure.

Referring to FIG. 2, some aspects of a non-limiting example of electrical machine 24 in accordance with an embodiment of the present disclosure is schematically illustrated. Electrical machine 24 includes a stator 60 and a rotor 62, each of which includes electrical generating components. In one form, stator 60 and rotor 62 are disposed adjacent to fan blades 34. In other embodiments, stator 60 and rotor 62 may be positioned adjacent to compressor blades and/or turbine blades in addition to or in place of fan blades 34.

In one form, stator 60 is positioned adjacent to shroud 36. In other embodiments, stator 60 may be positioned within shroud 36, or may be disposed in another suitable location. Stator 60 includes as an electrical generating component an armature component 64. In one form, armature component 64 is an armature winding. In various embodiments, armature component 64 may be in the form of a continuous ring extending circumferentially around rotor 62, or may be formed of discreet armature elements, e.g., windings, spaced apart circumferentially around rotor 62. In other embodiments, armature component 64 may take other forms.

Rotor 62 includes a hub 66, a plurality of struts 68, a plurality of rotor tips 70 and a plurality of electrical generating components in the form of field components 72. In one form, rotor 62 is configured to rotate the same speed as fan rotor stage 30 during the operation of engine 10. In other embodiments, rotor 62 may be configured to rotate at a different speed than fan rotor stage 30. In one form, hub 66 is formed integrally with wheel 32 as an extension of wheel 32. In other embodiments, hub 66 may be formed separately from wheel 32 and be coupled to wheel 32.

Struts 68 extend radially outward from hub 66, culminating at rotor tips 70. Struts 68 are spaced apart circumferentially. Struts 68 are configured to support field components 72. In one form, each strut 68 is configured to support and radially retain a single field component 72 during the operation of engine 10. In other embodiments, each strut 68 may support and retain more than one field component 72. In one form, each strut 68 is positioned adjacent to a blade 34. In other embodiments, struts 68 may be positioned adjacent to a compressor blade and/or a turbine blade in addition to or in place of blade 34. In one form, struts 68 are configured to rotate with blades 34, e.g., such that the position of each strut 68 relative to an adjacent blade 34 is maintained during the operation of engine 10. In one form, struts 68 are positioned downstream of blades 34, which in some embodiments may reduce or eliminate aerodynamic losses associated with struts 68.

Rotor tips 70 are positioned proximate to stator 60 in an axial position different from that of blades 34. In one form, rotor tips 70 are positioned downstream of fan blades 34. In other embodiments, rotor tips 70 may be positioned upstream of fan blades 34. Field components 72 are disposed adjacent to stator 60. In one form, field components 72 are in the form of magnets. In other embodiments, field components 72 may take other forms. In a particular form, field components 72 are in the form of permanent magnets. In other embodiments, other types of magnets may be employed as field components 72 in addition to or in place of permanent magnets, for example and without limitation, electromagnets.

Rotor 62 and stator 60 are configured to form a gap 74 therebetween, in particular, between field component 72 and armature component 64. In one form, electrical machine 24 is cooled by the airflow pressurized by fan rotor stage 30 that passes through gap 74. In other embodiments, electrical machine 24 may be cooled by other means in addition to or in place of the airflow pressurized by fan rotor stage 30 passing through gap 74.

Embodiments of the present disclosure include a gas turbine engine, comprising: a cold section stage being at least one of a fan blade stage and a compressor blade stage, wherein the cold section stage includes plurality of blades and a shroud circumferentially surrounding the plurality of blades; a combustor in fluid communication with the at least one of the fan blade stage and the compressor blade stage; a turbine in fluid communication with the combustor; and an electrical machine configured to generate electrical power, wherein the electrical machine includes a stator and a rotor; wherein the stator is positioned adjacent to or within the shroud; and wherein the rotor includes a rotor tip positioned proximate to the stator and in a different axial location than the blades.

In a refinement, the stator includes an armature component positioned adjacent to or within the shroud; and wherein the rotor tip includes a field component positioned proximate to the stator.

In another refinement, the armature component is an armature winding; and wherein the field component is a magnet.

In yet another refinement, the rotor includes a hub and a strut extending from the hub, wherein the strut is configured to support the field component.

In still another refinement, the strut is positioned adjacent to a blade of the cold section stage.

In yet still another refinement, the strut is positioned downstream of the blade.

In a further refinement, the strut is configured to rotate with the blade.

In a yet further refinement, the cold section stage includes a wheel; wherein the rotor includes a hub and a strut extending from the hub; wherein the strut is configured to support the field component; and wherein the hub is coupled to the wheel or is formed as an extension of the wheel.

In a still further refinement, the rotor is configured to operate at the same rotational speed as the cold section stage during operation of the gas turbine engine.

In a yet still further refinement, the electrical machine is cooled by airflow pressurized by the cold section stage.

In an additional refinement, the rotor and the stator are configured to form a gap between the rotor and stator; and wherein the electrical machine is cooled by the airflow passing through the gap.

Embodiments of the present disclosure include a gas turbine engine, comprising: at least one of a rotating fan stage and a rotating compressor stage; a combustor in fluid communication with the at least one of the rotating fan stage and the rotating compressor stage; at least one rotating turbine stage in fluid communication with the combustor; and an electrical machine configured to generate electrical power, wherein the electrical machine includes a stator and a rotor; wherein the at least one of the rotating fan stage and the rotating compressor stage and/or the at least one rotating turbine stage include a shroud circumferentially surrounding a plurality of blades of the at least one of the rotating fan stage and the rotating compressor stage and/or the at least one rotating turbine stage; and wherein the stator is positioned adjacent to or within the shroud; and wherein the rotor includes a rotor tip positioned proximate to the stator and in a different axial location than the blades.

In a refinement, the stator includes an armature component positioned adjacent to or within the shroud; and wherein the rotor tip includes a field component positioned proximate to the stator.

In another refinement, the at least one of the rotating fan stage and the rotating compressor stage and/or the at least one rotating turbine stage include a wheel; wherein the rotor includes a hub and a strut extending from the hub; wherein the strut is configured as part of the rotor; and wherein the hub is coupled to the wheel or is formed as an extension of the wheel.

In yet another refinement, the rotor is configured to operate at the same rotational speed as the at least one of the rotating fan stage and the rotating compressor stage and/or the at least one rotating turbine stage during operation of the gas turbine engine.

In still another refinement, the rotor includes a hub and a strut extending from the hub.

In yet still another refinement, the strut is positioned adjacent to a blade of the at least one of the rotating fan stage and the rotating compressor stage and/or the at least one rotating turbine stage.

In a further refinement, the strut is configured to rotate with the blade.

Embodiments of the present disclosure include a gas turbine engine, comprising: at least one of a rotating fan stage and a rotating compressor stage; a combustor in fluid communication with the at least one of the rotating fan stage and the rotating compressor stage; at least one rotating turbine stage in fluid communication with the combustor; and means for generating electrical power disposed adjacent to the at least one of the rotating fan stage and the rotating compressor stage and/or the at least one rotating turbine stage.

In a refinement, the means for generating electrical power includes a stator, a rotor having struts and first electrical generating components disposed at tips of the struts; wherein the struts are positioned adjacent to and configured to rotate with the at least one of the rotating fan stage and the rotating compressor stage and/or the at least one rotating turbine stage; wherein the at least one of the rotating fan stage and the rotating compressor stage and/or the at least one rotating turbine stage include a shroud; wherein the stator includes second electrical generating components positioned adjacent to or within the shroud.

While the disclosure has been described in connection with what is presently considered to be the most practical and preferred embodiment, it is to be understood that the disclosure is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the disclosure, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A gas turbine engine, comprising:
   a cold section stage being at least one of including a fan blade stage and a compressor blade stage, wherein the fan blade stage includes a wheel and a plurality of blades and a shroud circumferentially surrounding the plurality of blades;
   a combustor in fluid communication with the at least one of the fan blade stage and the compressor blade stage;
   a turbine in fluid communication with the combustor; and
   an electrical machine located between the fan blade stage and the compressor blade stage, the electrical machine being configured to generate electrical power, wherein the electrical machine includes a stator and a rotor; wherein the stator is positioned adjacent to or within the shroud; and wherein the rotor extends from the wheel of the fan blade stage.

2. The gas turbine engine of claim 1, wherein the stator includes an armature component positioned adjacent to or within the shroud; and wherein the rotor tip includes a field component positioned proximate to the stator.

3. The gas turbine engine of claim 2, wherein the armature component is an armature winding; and wherein the field component is a magnet.

4. The gas turbine engine of claim 2, wherein the rotor includes a hub and a strut extending from the hub, wherein the strut is configured to support the field component.

5. The gas turbine engine of claim 4, wherein the strut is positioned adjacent to a blade of the cold section stage.

6. The gas turbine engine of claim 5, wherein the strut is positioned downstream of the blade.

7. The gas turbine engine of claim 5, wherein the strut is configured to rotate with the blade.

8. The gas turbine engine of claim 2, wherein the rotor includes a hub and a strut extending from the hub; wherein the strut is configured to support the field component; and wherein the hub is coupled to the wheel or is formed as an extension of the wheel.

9. The gas turbine engine of claim 1, wherein the rotor is configured to operate at the same rotational speed as the cold section stage during operation of the gas turbine engine.

10. The gas turbine engine of claim 1, wherein the electrical machine is cooled by airflow pressurized by the cold section stage.

11. The gas turbine engine of claim 10, wherein the rotor and the stator are configured to form a gap between the rotor and stator; and wherein the electrical machine is cooled by the airflow passing through the gap.

12. The gas turbine engine of claim 1, wherein the stator is spaced apart circumferentially around the rotor.

13. A gas turbine engine, comprising: a rotating fan and a rotating compressor;
a combustor in fluid communication with the at least one of the rotating fan and the rotating compressor;
at least one rotating turbine in fluid communication with the combustor; and
an electrical machine configured to generate electrical power,
wherein the electrical machine is located between the rotating fan and the rotating compressor, the electrical machine including a stator and a rotor;
wherein at least the rotating fan includes a shroud circumferentially surrounding a plurality of blades of the rotating fan;
and wherein the stator is positioned adjacent to or within the shroud; wherein the rotor extends from the rotating fan and includes a rotor tip positioned proximate to the stator and in a different axial location than the blades; and wherein the stator is spaced apart circumferentially around the rotor.

14. The gas turbine engine of claim 13, the at least one of the rotating fan stage and the rotating compressor stage and/or the at least one rotating turbine stage include includes a wheel; wherein the rotor includes a hub and a strut extending from the hub; wherein the strut is configured as part of the rotor; and wherein the hub is coupled to the wheel or is formed as an extension of the wheel.

15. The gas turbine engine of claim 13, wherein the rotor is configured to operate at the same rotational speed as the at least one of the rotating fan stage and the rotating compressor stage and/or the at least one rotating turbine stage during operation of the gas turbine engine.

16. The gas turbine engine of claim 13, wherein the rotor includes a hub and a strut extending from the hub.

17. The gas turbine engine of claim 16, wherein the strut is positioned adjacent to a blade of the at least one of the rotating fan stage and the rotating compressor stage and/or the at least one rotating turbine stage.

18. A gas turbine engine, comprising:
a rotating fan and a rotating compressor, the rotating fan including a wheel and a plurality of blades;
a combustor in fluid communication with the rotating fan and the rotating compressor;
at least one rotating turbine in fluid communication with the combustor; and
means for generating electrical power disposed the rotating fan and the rotating compressor, the means for generating electrical power including a stator spaced apart circumferentially around a rotor, wherein the rotor extends from the wheel.

19. The gas turbine engine of claim 18, wherein the rotor has struts and first electrical generating components disposed at tips of the struts; wherein the struts are positioned adjacent to and configured to rotate with at least one of the rotating fan; wherein at least the rotating fan includes a shroud; wherein the stator includes second electrical generating components positioned adjacent to or within the shroud.

* * * * *

UNITED STATES PATENT AND TRADEMARK OFFICE
CERTIFICATE OF CORRECTION

| | | |
|---|---|---|
| PATENT NO. | : 9,077,221 B2 | Page 1 of 1 |
| APPLICATION NO. | : 14/105370 | |
| DATED | : July 7, 2015 | |
| INVENTOR(S) | : Mark S. McCormick | |

It is certified that error appears in the above-identified patent and that said Letters Patent is hereby corrected as shown below:

On the Title Page, item (57), in the abstract: line 1,

Please replace "is" with "disclosure"

It should read: One embodiment of the present disclosure may include. . .

In the Claims:

At column 8, claim number 14, line number 3, delete "include" after the word stage.

It should read: ... the at least one rotating turbine stage includes a ...

Signed and Sealed this
Fifteenth Day of March, 2016

Michelle K. Lee
*Director of the United States Patent and Trademark Office*